US012731895B2

(12) United States Patent
Lin et al.

(10) Patent No.: US 12,731,895 B2

(45) Date of Patent: Sep. 8, 2026

(54) ANTENNA STRUCTURE AND ELECTRONIC DEVICE

(71) Applicant: Shenzhen Fulian Fugui Precision Industry Co., Ltd., Shenzhen (CN)

(72) Inventors: Shiou-Jen Lin, New Taipei (TW); Yen-Ming Tseng, New Taipei (TW)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 60 days.

(21) Appl. No.: 19/006,589

(22) Filed: Dec. 31, 2024

(65) Prior Publication Data

US 2026/0188901 A1 Jul. 2, 2026

(51) Int. Cl.

*H01Q 1/24* (2006.01)
*H01Q 1/00* (2006.01)
*H01Q 1/22* (2006.01)
*H01Q 1/38* (2006.01)
*H01Q 1/48* (2006.01)
*H01Q 1/52* (2006.01)

(Continued)

(52) U.S. Cl.

CPC ............... *H01Q 5/20* (2015.01); *H01Q 1/002* (2013.01); *H01Q 1/22* (2013.01); *H01Q 1/48* (2013.01); *H01Q 1/521* (2013.01); *H01Q 5/10* (2015.01); *H01Q 9/0407* (2013.01)

(58) Field of Classification Search

CPC ............ H01Q 1/00; H01Q 1/002; H01Q 1/22; H01Q 1/24; H01Q 1/243; H01Q 1/38; H01Q 1/48; H01Q 1/50; H01Q 1/52; H01Q 1/521; H01Q 5/10; H01Q 5/20; H01Q 5/378; H01Q 9/40; H01Q 9/04; H01Q 9/0407

See application file for complete search history.

(56) References Cited

U.S. PATENT DOCUMENTS 7,403,160 B2 * 7/2008 Chiang .................. H01Q 19/32 343/702
7,535,431 B2 * 5/2009 Rowell .................. H01Q 1/243 343/846

(Continued)

FOREIGN PATENT DOCUMENTS

CN 101740856 6/2010
CN 117855813 A 4/2024

(Continued)

*Primary Examiner* — Tho G Phan

(74) *Attorney, Agent, or Firm* — ScienBiziP, P.C.

(57) ABSTRACT

An antenna structure includes a first antenna and a second antenna, the first antenna includes: a first radiation part arranged on a first surface of a mainboard; a first external metal strip with one end fixed on a second surface of the mainboard to excite a first operating frequency band; a first grounding extension part with one end connected to metal grounding plane to excite a second operating frequency band and a third operating frequency band; the second antenna includes: a second radiation part arranged on the first surface; a second external metal strip with one end fixed on the second surface to excite the first operating frequency band; a third radiation part with one end connected to the second radiation part; a second grounding extension part with one end connected to the metal grounding plane to excite the second operating frequency band and the third operating frequency band.

18 Claims, 5 Drawing Sheets

(51) Int. Cl.

| | |
|---|---|
| ***H01Q 5/10*** | (2015.01) |
| ***H01Q 5/20*** | (2015.01) |
| ***H01Q 9/04*** | (2006.01) |

(56) References Cited

U.S. PATENT DOCUMENTS

| | | | | |
|---|---|---|---|---|
| 8,890,753 | B1 * | 11/2014 | Lee | H01Q 1/243<br>343/702 |
| 8,947,314 | B2 * | 2/2015 | Wong | H01Q 5/392<br>343/848 |
| 9,343,801 | B2 * | 5/2016 | Chou | H01Q 1/48 |
| 10,038,245 | B2 * | 7/2018 | Choi | H01Q 1/48 |
| 12,206,163 | B2 * | 1/2025 | Jiang | H01Q 1/421 |

FOREIGN PATENT DOCUMENTS

| | | | |
|---|---|---|---|
| TW | M352147 | | 3/2009 |
| TW | 201524004 | A | 6/2015 |
| TW | 201537824 | A | 10/2015 |
| TW | 202420650 | A | 5/2024 |

* cited by examiner

ANTENNA STRUCTURE AND ELECTRONIC DEVICE

FIELD

The present disclosure relates to a field of antenna design technology, particularly to an antenna structure and electronic device.

BACKGROUND

In recent years, to meet consumer market's demand for miniaturization of wireless communication products, the size of wireless communication products has been gradually reduced. However, the reduction in size has led to poor heat dissipation and affected product performance. In addition, some communication protocols such as LTE 4th generation mobile communication technology have a low frequency range of 698 MHz –960 MHz, resulting in a large antenna size. Therefore, it is a challenge to ensure better low-frequency radiation characteristics and good heat dissipation performance in a limited space.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
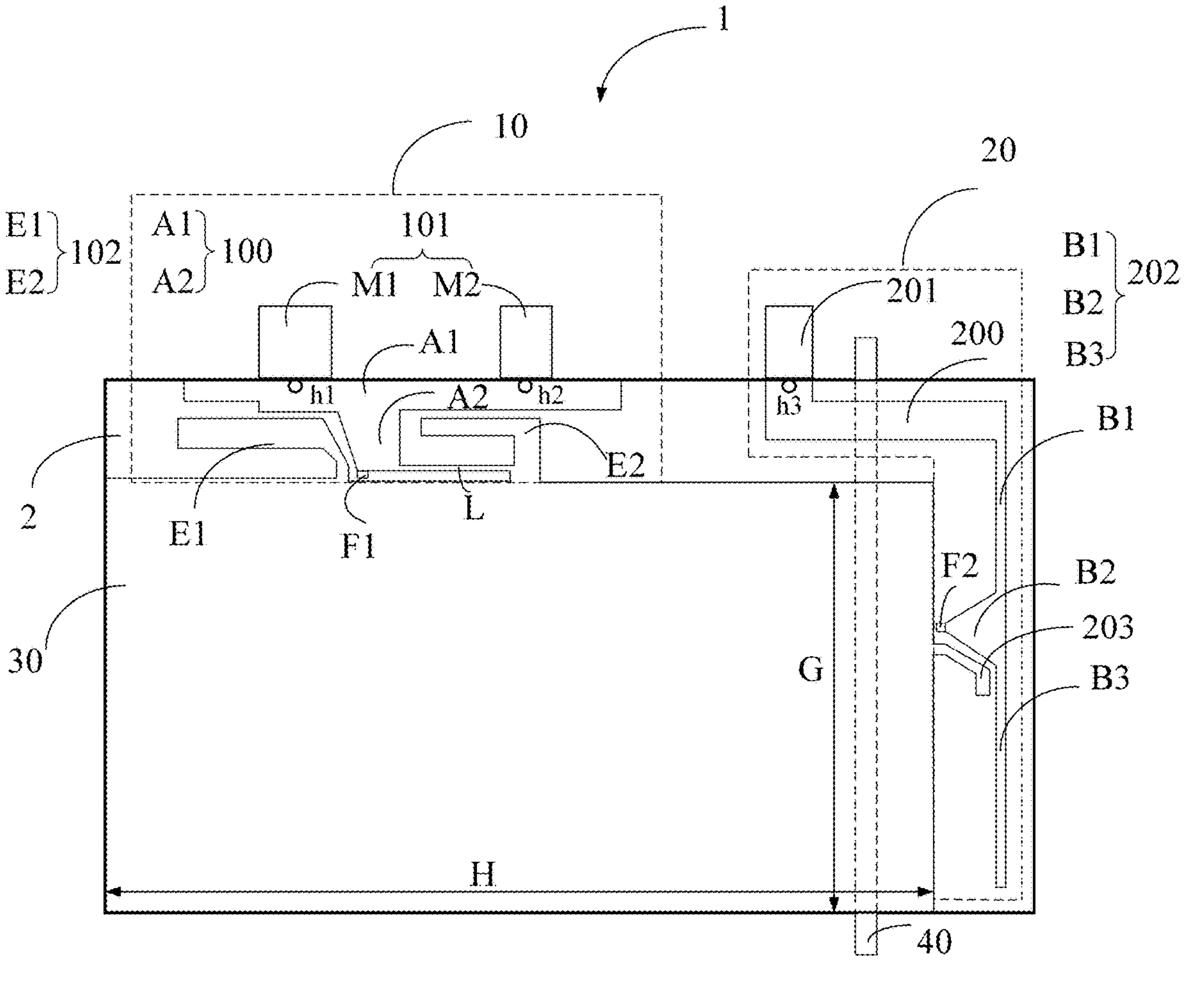
FIG. 1 is a front view of an antenna structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a front view of an antenna structure according to an embodiment of the present disclosure. In the embodiment, an antenna structure 1 is mainly applied to electronic devices, which can be mobile terminals such as smartphones, tablets, laptops, handheld computers, personal digital assistants (PDAs), portable media players (PMPs), navigation devices, wearable devices, smart bracelets, pedometers, etc.

As shown in FIG. 1, the antenna structure 1 is arranged on a mainboard 2, and the mainboard 2 may also include other functional modules (not shown in FIG. 1) depending on actual needs. The antenna structure 1 includes a first antenna 10, a second antenna 20 and a metal grounding plane 30. The metal grounding plane 30 is preferably a rectangular grounding plane.

In the embodiment, the first antenna 1 includes a first radiation part 100, a first external metal strip 101, a first grounding extension part 102. The first radiation part 100 is arranged on a first surface of the mainboard 2 and located on a first side of the metal grounding plane 30. One end of the first external metal strip 101 is fixed on a second surface of the mainboard 2 and electrically connected to the first radiation part 100, and another end of the first external metal strip 101 is suspended and extends along an outside direction of the mainboard 2. The first external metal strip 101 is coupled with the first radiation part 100 to excite a first operating frequency band. The first operating frequency band is a low-frequency band with a frequency range of 690 MHz~960 MHz. One end of the first grounding extension part 102 is electrically connected to the first side of the metal grounding plane 30 and the first radiation part 100, another end of the first grounding extension part 102 is suspended. The first grounding extension part 102 is coupled with the first radiation part 100 to excite a second operating frequency band and a third operating frequency band. The second operating frequency band is an intermediate frequency band with a frequency range of 1710 MHz~2170 MHz, and the third operating frequency band is a high-frequency band with a frequency range of 2620 MHz~2690 MHz.

In the embodiment, the first radiation part includes a first radiator A1 and a second radiator A2. The first radiator A1 is in a long strip shape and parallel to the first side of the metal grounding plane 30. The second radiator A2 is in a trapezoid shape. A lower base of the second radiator A2 is electrically connected to the first radiator A1, one end of an upper base of the second radiator A2 is a first feeding end F1, and the other end of the upper base of the second radiator A2 is electrically connected to the first grounding extension part 102 through a microstrip line L. The first grounding extension part 102 includes a first extension part E1 and a second extension part E2. The first extension part E1 is in a ]-shaped. The first extension part E1 is located on one side of the second radiator A2 and extends from the first side of the metal grounding plane 30 along a direction from the one side of the second radiator A2 to the first radiator A1. The second extension part E2 is in a ]-shaped. The second extension part E2 is located on the other side of the second radiator A2 and extends from the first side of the metal grounding plane 30 along a direction from the first radiator A1 to the other side of the second radiator A2. The first extension part E1 and the second extension part E2 extend in the same direction. The first external metal strip 102 includes a first metal strip M1 and a second metal strip M2. One end of the first metal strip M1 is fixed on a projected position of the first radiator A1 on the second face of the mainboard 2 and electrically connected to the first radiator A1 by a first via h1, and the other end of the first metal strip M1 is suspended. One end of the second metal strip M2 is fixed on the projected position of the first radiator A1 on the second face of the mainboard 2 and electrically connected to the second radiator A2 by a second via h2, the other end of the second metal strip M2 is suspended. A preset spacing is arranged between the first metal strip M1 and the second metal strip M2.

Figure 2:
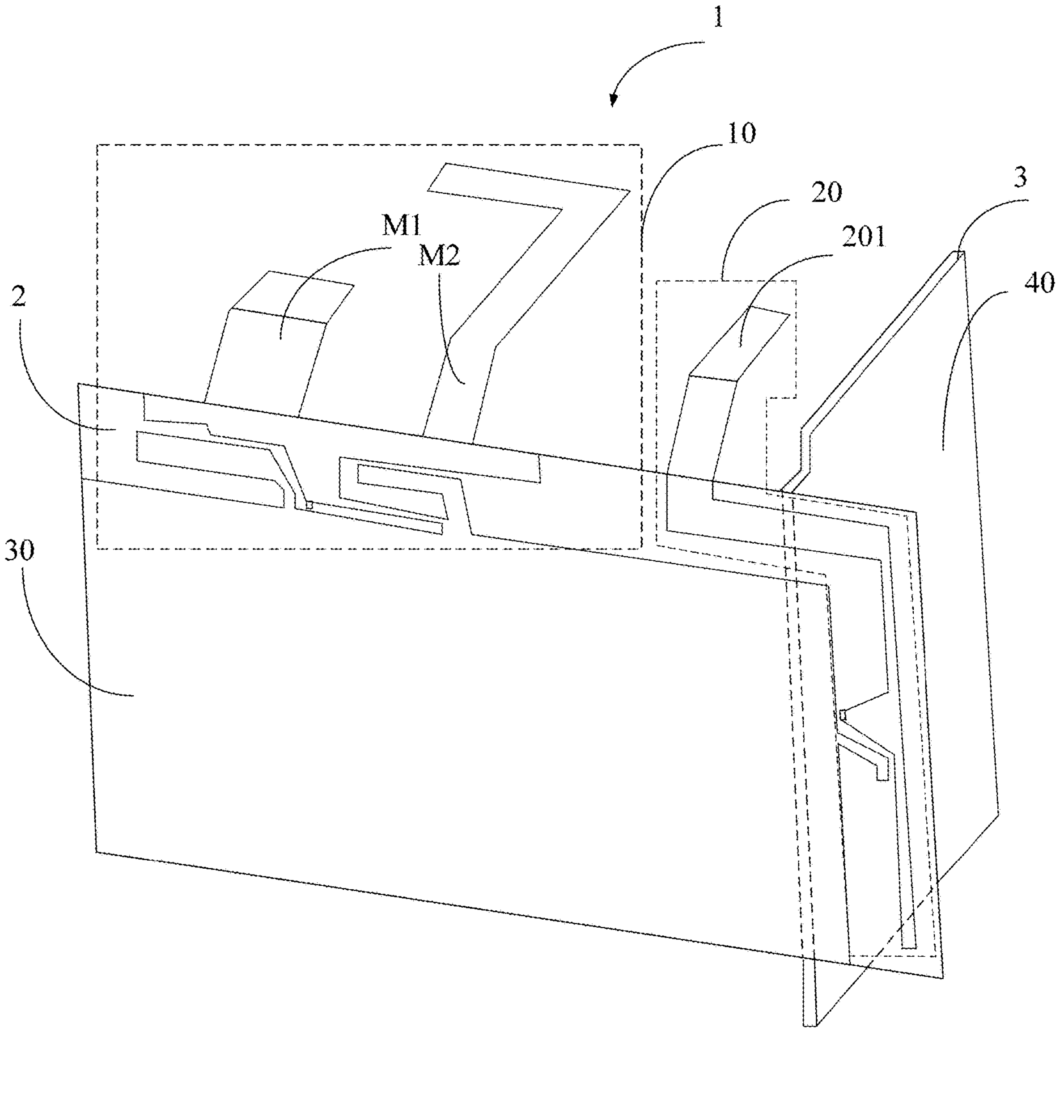
FIG. 2 is a three-dimensional schematic diagram of an antenna structure according to another embodiment of the present disclosure.

Combined with FIG. 1 and FIG. 2, FIG. 2 is a three-dimensional schematic diagram of an antenna structure 1 according to an embodiment of the present disclosure. As shown in FIG. 2, the first metal strip M1 and the second metal strip M2 extend along the outside of the mainboard 2. The first metal strip M1 is preferably in a long strip shape, and the second metal sheet M2 is preferably a ]-shaped. In practical applications, the first metal strip M1 and the second metal strip M2 can be bent according to spatial limitation. The first antenna 10 extends a low-frequency current resonance path through the first metal strip M1 and the second metal strip M2, achieving a low-frequency frequency range of 690 MHz~960 MHz. By extending the first extension part E1 and the second extension part E2 from the metal grounding plane 30 and coupling the first radiation part 200, the intermediate frequency band of 1710 MHz~2170 MHz and the high frequency band of 2620 MHz~2690 MHz are excited.

As shown in FIG. 1, in the embodiment, the second antenna 20 includes a second radiation part 200, a second external metal strip 201, a third radiation part 202, a second grounding extension part 203. The second radiation part 200 is arranged on the first surface of the mainboard 2 and located on the first side of the metal grounding plane 30. One end of the second external metal strip 201 is fixed on the second surface of the mainboard 2 and electrically connected to the second radiation 200, and another end of the second external metal strip 201 is suspended and extends along the outside direction of the mainboard2. The second external metal strip 201 is coupled with the second radiation part 200 to excite the first operating frequency band. The second radiation part 200 is in a L-shaped, and one end of the second external metal strip 201 is fixed on a projection position of the second radiating part 200 on the second surface of the mainboard 2 and electrically connected to the second radiation part 200 by a third via h3.

Combined with FIG. 1 and FIG. 2, the second external metal strip 201 extends along the outside of the mainboard 2. The second external metal strip 201 is preferably a long strip shape. In practical applications, the second external metal strip 201 can be bent according to spatial limitation. The third radiation part 202 is located on a second side perpendicular to the first side of the metal grounding plane 30. One end of the third radiation part 202 is vertically connected to the second radiation part 200, another end of the third radiation part 202 is suspended. One end of the second grounding part 203 is electrically connected to the second side of the metal grounding plane 30, another end of the second grounding extension part 203 is suspended, and the second grounding extension part 30 is coupled with the third radiation part 202 to excite the second operating frequency band and the third operating frequency band.

In the embodiment, the third radiation part 202 includes a third radiator B1, a fourth radiator B2 and a fifth radiator B3. The third radiator B1 is in a long strip shape, and one end of the third radiator B1 is electrically connected to the second radiation part 200. A first angle of the fourth radiator B2 is electrically connected to the other end of the third radiator B1, a second angle of the fourth radiator B2 is a second feeding end F2. A fifth radiator B3 is in a long strip shape, one end of the fifth radiator B3 is electrically connected to a third angle of the fourth radiator B2 and the other end of the fifth radiator B3 is suspended. The second grounding extension part 203 is in a winding shape and extends from the second side of the metal grounding plane 30 along a direction from the fourth radiator B2 to the fifth radiator B3.

In the embodiment, the antenna structure 1 further includes a third external metal strip 40, and the third external metal strip 40 is vertically fixed to the second surface of the mainboard 2 and electrically connected to the metal grounding plane 30 for mainboard heat dissipation. The third external metal strip 40 is further used to extend the grounding plane to increase the length of the low-frequency resonance path, thereby adjusting the antenna center frequency and achieving better impedance matching. The third external metal strip 40 is located between the third radiation part 202 and the first antenna 10 to increase an isolation between the first antenna 10 and the second antenna 20. Combined with FIG. 2, the third external metal strip 40 can be set on a substrate 3, and the substrate 3 is vertically fixed to the second surface of the mainboard 2.

Figure 3:
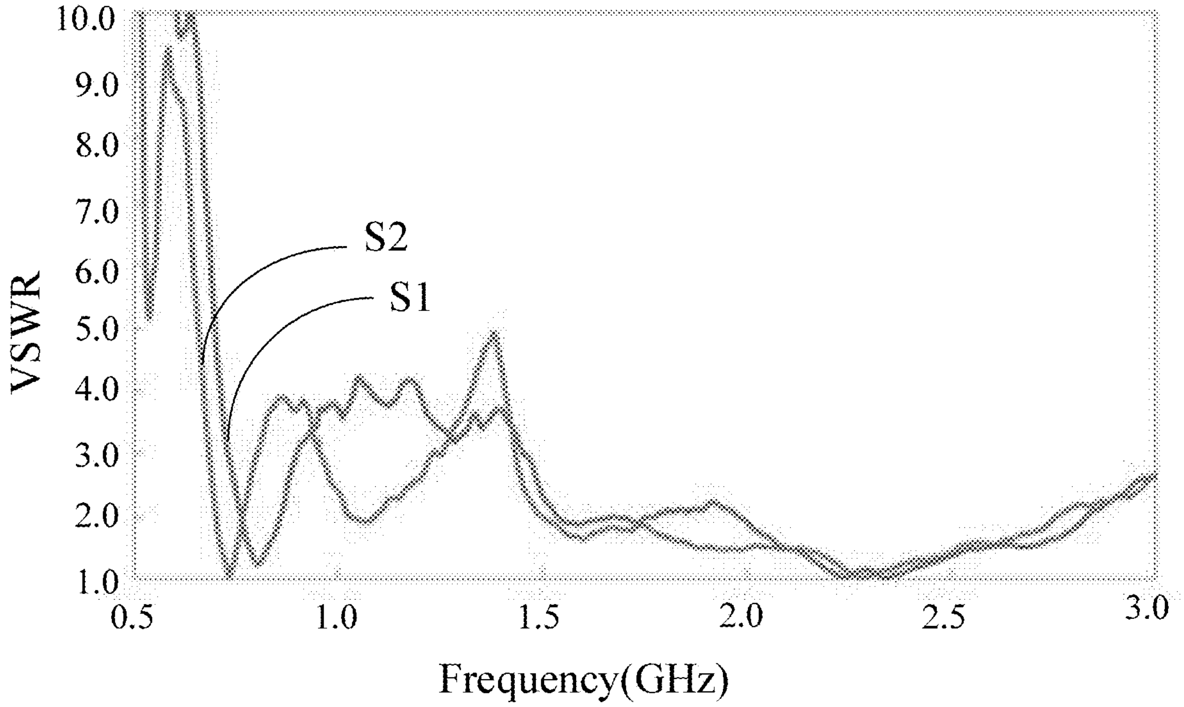
FIG. 3 is a graph of a center frequency of a low frequency band when a third external metal plane is provided and a graph of the center frequency when a third external metal plane is not provided according to the antenna structure in FIG. 1.

Combined with FIG. 3, FIG. 3 is a curve of the center frequency of the low frequency band when the third external metal plane is provided and a curve of the center frequency when a third external metal plane is not provided according to the antenna structure of an embodiment of the present disclosure. As shown in FIG. 3, when the third external metal plane 40 is not provided, according to curve S1, the center frequency of the low-frequency band is about 800 MHz. When the third external metal plane 40 is provided, according to curve S2, the center frequency of the low-frequency band shifts from 800 MHz to 740 MHz, with an offset ratio of about 7.5%.

The third external metal plane 40 is arranged between the third radiation part 202 and the first antenna 10, which can increase the isolation between the first antenna 10 and the second antenna 20, and improve the radiation characteristics.

Figure 4:
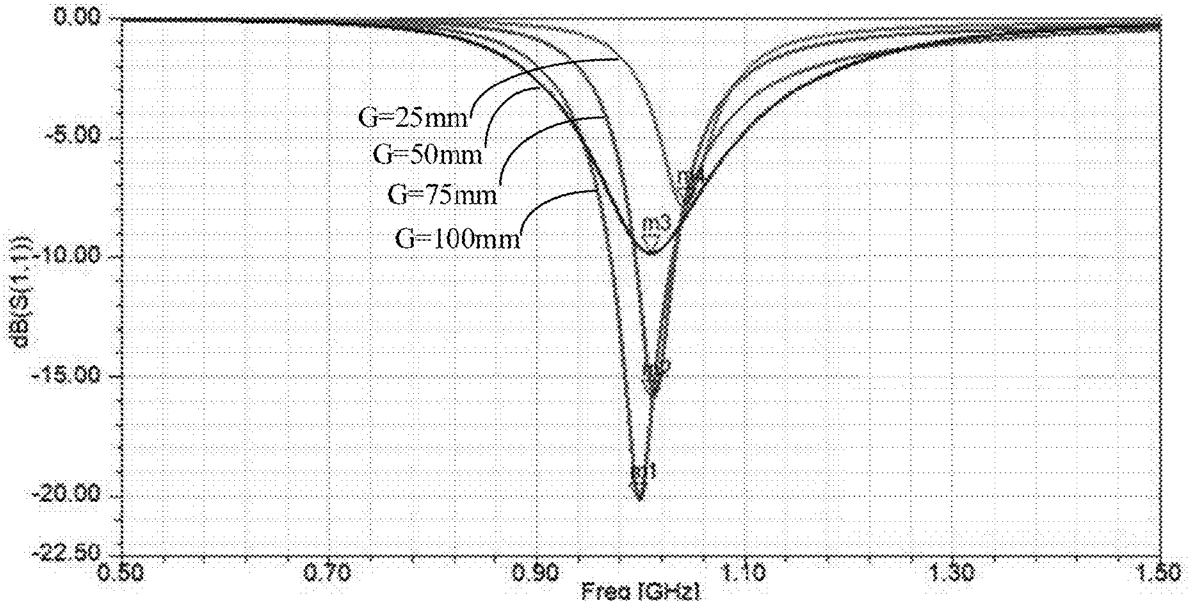
FIG. 4 is a graph diagram of the center frequency of a first operating frequency band changing with a width of a metal grounding plane.
Figure 5:
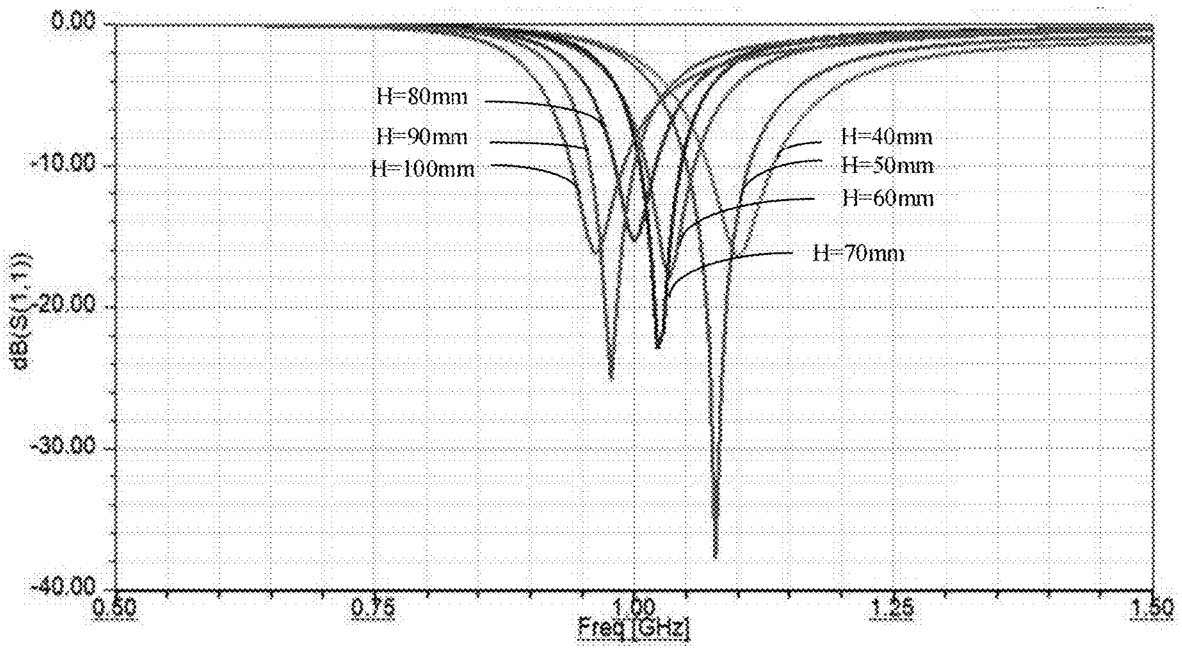
FIG. 5 is a graph diagram of the center frequency of the first operating frequency band changing with a length H of the metal grounding plane.

Without changing the antenna design, the larger the metal grounding plane 30, the closer the center frequency is to lower frequency. Specifically, the center frequency of the first operating frequency band of the first antenna 10 and the second antenna 20 is adjustable by adjusting a width G of the metal grounding plane 30. Combined with FIG. 4, FIG. 4 is a curve diagram of the center frequency of the first operating frequency band changing with the width G of the metal grounding plane 30. Taking the first antenna 10 as an example, when the widths G are 100 mm, 75 mm, 50 mm, and 25 mm, the center frequency of the first operating frequency band of the first antenna 10 slowly shifts towards lower frequencies as the width G of the metal ground plane 30 increases, but the shift effect is not obvious. Furthermore, the center frequency of the first operating frequency band of the first antenna 10 and the second antenna 20 is adjustable by adjusting a length H of the metal grounding plane 30. Combined with FIG. 5, FIG. 5 is a curve diagram of the center frequency of the first operating frequency band changing with the length H of the metal grounding plane 30. Taking the first antenna 10 as an example, when the length H is 40 mm, the center frequency of the first operating frequency band of the first antenna 10 is 1.1 GHz. When the length H is 50 mm, the center frequency of the first operating frequency band of the first antenna 10 is 1.07 GHz. When the length H is 60 mm, the center frequency of the first operating frequency band of the first antenna 10 is 1.03 GHz. When the length H is 70 mm, the center frequency of the first operating frequency band of the first antenna 10 is 1.01 GHz. When the length H is 80 mm, the center frequency of the first operating frequency band of the first antenna 10 is 1 GHz. When the length H is 90 mm, the center frequency of the first operating frequency band of the first antenna 10 is 0.91 GHz. When the length H is 100 mm, the center frequency of the first operating frequency band of the first antenna 10 is 1.96 GHz. The center frequency of the first operating frequency band of the first antenna 10 shifts towards lower frequencies as the length H of the metal ground plane 30 increases, but the shift effect is obvious.

Compared with the prior art, the first antenna and the second antenna extend the low-frequency current resonance path through connecting external metal planes to achieve the low-frequency band, and the intermediate-high frequency bands are excited by extending the grounding extension parts from the metal grounding plane to meet the frequency band requirements of the antenna, and the low-frequency band is achieved by the external metal strips to reduce the size of the antenna structure, achieving product miniaturization. Preferably, an external metal strip is set between the first antenna and the second antenna can not only be used for mainboard heat dissipation, but also for extending the grounding plane to increase the length of the low-frequency resonance path, thereby adjusting the center frequency of the antenna and having better impedance matching.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising a first antenna and a second antenna, wherein the first antenna comprises:

a first radiation part arranged on a first surface of a mainboard and located on a first side of a metal grounding plane;

a first external metal strip, wherein one end of the first external metal strip is fixed on a second surface of the mainboard and electrically connected to the first radiation part, another end of the first external metal strip is suspended, and the first external metal strip is coupled with the first radiation part to excite a first operating frequency band;

a first grounding extension part, wherein one end of the first grounding extension part is electrically connected to the first side of the metal grounding plane and the first radiation part, another end of the first grounding extension part is suspended, and the first grounding extension part is coupled with the first radiation part to excite a second operating frequency band and a third operating frequency band;

the second antenna comprises:

a second radiation part arranged on the first surface of the mainboard and located on the first side of the metal grounding plane;

a second external metal strip, wherein one end of the second external metal strip is fixed on the second surface of the mainboard and electrically connected to the second radiation part, another end of the second external metal strip is suspended and extends along the outside direction of the mainboard, and the second external metal strip is coupled with the second radiation part to excite the first operating frequency band;

a third radiation part located on a second side perpendicular to the first side of the metal grounding plane, wherein one end of the third radiation part is vertically connected to the second radiation part, another end of the third radiation part is suspended;

a second grounding extension part, wherein one end of the second grounding part is electrically connected to the second side of the metal grounding plane, another end of the second grounding extension part is suspended, and the second grounding extension part is coupled with the third radiation part to excite the second operating frequency band and the third operating frequency band.

2. The antenna structure according to claim 1, further comprising:

a third external metal strip vertically fixed on the second surface of the mainboard and electrically connected to the metal grounding plane for mainboard heat dissipation and extending grounding plane, wherein the third external metal strip is further located between the third radiation part and the first antenna to increase an isolation between the first antenna and the second antenna.

3. The antenna structure according to claim 1, wherein the first radiation part comprises:

a first radiator in a long strip shape;

a second radiator in a trapezoid shape, wherein a lower base of the second radiator is electrically connected to the first radiator, one end of an upper base of the second radiator is a first feeding end, and the other end of the upper base of the second radiator is electrically connected to the first grounding extension part through a microstrip line.

4. The antenna structure according to claim 3, wherein the first grounding extension part comprises:

a first extension part in a ]-shaped, wherein the first extension part is located on one side of the second radiator and extends from the first side of the metal grounding plane along a direction from the one side of the second radiator to the first radiator;

a second extension part in a ]-shaped, wherein the second extension part is located on the other side of the second radiator and extends from the first side of the metal grounding plane along a direction from the first radiator to the other side of the second radiator.

5. The antenna structure according to claim 3, wherein the first external metal strip comprises:

a first metal strip, wherein one end of the first metal strip is fixed on a projected position of the first radiator on the second face of the mainboard, and the other end of the first metal strip is suspended;

a second metal strip, wherein one end of the second metal strip is fixed on the projected position of the first radiator on the second face of the mainboard, the other end of the second metal strip is suspended, and a preset spacing is arranged between the first metal strip and the second metal strip.

6. The antenna structure according to claim 1, wherein the second radiation part is in a L-shaped, and one end of the second external metal strip is fixed on a projected position of the second radiation part on the second surface of the main board.

7. The antenna structure according to claim 1, wherein the third radiation part comprises:

a third radiator in a long strip shape, wherein one end of the third radiator is electrically connected to the second radiation part;

a fourth radiator in a triangle shape, wherein a first angle of the fourth radiator is electrically connected to the other end of the third radiator, a second angle of the fourth radiator is a second feeding end;

a fifth radiator in a long strip shape, wherein one end of the fifth radiator is electrically connected to a third angle of the fourth radiator and the other end of the fifth radiator is suspended.

8. The antenna structure according to claim 7, wherein the second grounding extension part is in a winding shape and extends from the second side of the metal grounding plane along a direction from the fourth radiator to the fifth radiator.

9. The antenna structure according to claim 1, wherein:

a center frequency of the first operating frequency band of the first antenna and the second antenna is adjustable by adjusting a width of the metal grounding plane;

the center frequency of the first operating frequency band of the first antenna and the second antenna is adjustable by adjusting a length of the metal grounding plane.

10. An electronic device comprising an antenna structure, wherein the antenna structure comprises a first antenna and a second antenna, and the first antenna comprises:

a first radiation part arranged on a first surface of a mainboard and located on a first side of a metal grounding plane;

a first external metal strip, wherein one end of the first external metal strip is fixed on a second surface of the mainboard and electrically connected to the first radiation part, another end of the first external metal strip is suspended and extends along an outside direction of the mainboard, and the first external metal strip is coupled with the first radiation part to excite a first operating frequency band;

a first grounding extension part, wherein one end of the first grounding extension part is electrically connected to the first side of the metal grounding plane and the first radiation part, another end of the first grounding extension part is suspended, and the first grounding extension part is coupled with the first radiation part to excite a second operating frequency band and a third operating frequency band;

the second antenna comprises:

a second radiation part arranged on the first surface of the mainboard and located on the first side of the metal grounding plane;

a second external metal strip, wherein one end of the second external metal strip is fixed on the second surface of the mainboard and electrically connected to the second radiation part, another end of the second external metal strip is suspended and extends along the outside direction of the mainboard, and the second external metal strip is coupled with the second radiation part to excite the first operating frequency band;

a third radiation part located on a second side perpendicular to the first side of the metal grounding plane, wherein one end of the third radiation part is vertically connected to the second radiation part, another end of the third radiation part is suspended;

a second grounding extension part, wherein one end of the second grounding part is electrically connected to the second side of the metal grounding plane, another end of the second grounding extension part is suspended, and the second grounding extension part is coupled with the third radiation part to excite the second operating frequency band and the third operating frequency band.

11. The electronic device according to claim 10, wherein the antenna structure further comprises a third external metal strip vertically fixed on the second surface of the mainboard and electrically connected to the metal grounding plane for mainboard heat dissipation and extending grounding plane, wherein the third external metal strip is further located between the third radiation part and the first antenna to increase an isolation between the first antenna and the second antenna.

12. The electronic device according to claim 10, wherein the first radiation part comprises:

a first radiator in a long strip shape;

a second radiator in a trapezoid shape, wherein a lower base of the second radiator is electrically connected to the first radiator, one end of an upper base of the second radiator is a first feeding end, and the other end of the upper base of the second radiator is electrically connected to the first grounding extension part through a microstrip line.

13. The electronic device according to claim 12, wherein the first grounding extension part comprises:

a first extension part in a ⅂-shaped, wherein the first extension part is located on one side of the second radiator and extends from the first side of the metal grounding plane along a direction from the one side of the second radiator to the first radiator;

a second extension part in a ⅂-shaped, wherein the second extension part is located on the other side of the second radiator and extends from the first side of the metal grounding plane along a direction from the first radiator to the other side of the second radiator.

14. The electronic device according to claim 12, wherein the first external metal strip comprises:

a first metal strip, wherein one end of the first metal strip is fixed on a projected position of the first radiator on the second face of the mainboard, and the other end of the first metal strip is suspended;

a second metal strip, wherein one end of the second metal strip is fixed on the projected position of the first radiator on the second face of the mainboard, the other end of the second metal strip is suspended, and a preset spacing is arranged between the first metal strip and the second metal strip.

15. The electronic device according to claim 10, wherein the second radiation part is in a L-shaped, and one end of the second external metal strip is fixed on a projected position of the second radiation part on the second surface of the main board.

16. The electronic device according to claim 10, wherein the third radiation part comprises:

a third radiator in a long strip shape, wherein one end of the third radiator is electrically connected to the second radiation part;

a fourth radiator in a triangle shape, wherein a first angle of the fourth radiator is electrically connected to the other end of the third radiator, a second angle of the fourth radiator is a second feeding end;

a fifth radiator in a long strip shape, wherein one end of the fifth radiator is electrically connected to a third angle of the fourth radiator and the other end of the fifth radiator is suspended.

17. The electronic device according to claim 16, wherein the second grounding extension part is in a winding shape and extends from the second side of the metal grounding plane along a direction from the fourth radiator to the fifth radiator.

18. The electronic device according to claim 10, wherein:

a center frequency of the first operating frequency band of the first antenna and the second antenna is adjustable by adjusting a width of the metal grounding plane;

the center frequency of the first operating frequency band of the first antenna and the second antenna is adjustable by adjusting a length of the metal grounding plane.

* * * * *